(12) United States Patent
Lee et al.

(10) Patent No.: US 9,403,485 B2
(45) Date of Patent: Aug. 2, 2016

(54) INSIDE MIRROR ASSEMBLY FOR VEHICLE

(71) Applicant: Hyundai Motor Company, Seoul (KR)

(72) Inventors: Jin Hee Lee, Seoul (KR); Bock Cheol Lee, Suwon-si (KR); Nak Kyoung Kong, Seongnam-si (KR); Young Sub Oh, Suwon-si (KR); Hyun Sub Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/570,444

(22) Filed: Dec. 15, 2014

(65) Prior Publication Data

US 2015/0329053 A1    Nov. 19, 2015

(30) Foreign Application Priority Data

May 13, 2014 (KR) .......................... 10-2014-0057030

(51) Int. Cl.
*B60R 1/04* (2006.01)
*B60R 1/08* (2006.01)

(52) U.S. Cl.
CPC . *B60R 1/086* (2013.01); *B60R 1/04* (2013.01); *B60R 1/083* (2013.01)

(58) Field of Classification Search
CPC ............ B60R 1/04; B60R 1/083; B60R 1/086
USPC .......................... 359/604, 605, 606, 608, 872
See application file for complete search history.

(56) References Cited

U.S. PATENT DOCUMENTS

| | | | | |
|---|---|---|---|---|
| 1,919,475 A | * | 7/1933 | McKinley | B60R 1/086 359/605 |
| 2,420,259 A | * | 5/1947 | McNamara | B60R 1/086 359/605 |
| 2,502,699 A | * | 4/1950 | Budreck | B60R 1/086 359/605 |
| 2,669,159 A | * | 2/1954 | Rogers | B60R 1/086 359/606 |
| 2,782,686 A | * | 2/1957 | Rothgart | B60R 1/086 248/480 |
| 6,598,980 B2 | * | 7/2003 | Marusawa | B60R 1/086 359/603 |

FOREIGN PATENT DOCUMENTS

| | | |
|---|---|---|
| JP | 5-89082 U | 12/1993 |
| JP | 10-86750 A | 4/1998 |
| JP | 2001-233125 A | 8/2001 |
| KR | 2003-0003957 A | 1/2003 |
| KR | 10-2004-0013013 A | 2/2004 |
| KR | 10-2006-0020275 A | 3/2006 |
| KR | 10-2011-0076787 A | 7/2011 |
| KR | 10-2012-0062525 A | 6/2012 |

* cited by examiner

*Primary Examiner* — Ricky D Shafer
(74) *Attorney, Agent, or Firm* — Morgan, Lewis & Bockius LLP

(57) ABSTRACT

An inside mirror assembly for a vehicle may include a housing which has an opening portion formed at a front side thereof, a fixed reflective plate which is fixed and mounted to the opening portion of the housing, a tilting reflective plate which is tiltably mounted in the housing, and disposed parallel to a rear surface of the fixed reflective plate in a day reflective mode, or disposed so that an upper end portion of the tilting reflective plate is tiltable rearward at a predetermined angle on a basis of a lower end portion of the tilting reflective plate in order to reduce light reflectivity in a night reflective mode, and a tilting operation mechanism which is connected with the tilting reflective plate, mounted inside and outside of the housing, and adjusts a tilting angle of the tilting reflective plate.

7 Claims, 6 Drawing Sheets

INSIDE MIRROR ASSEMBLY FOR VEHICLE

CROSS-REFERENCE TO RELATED APPLICATION

The present application claims priority to Korean Patent Application No. 10-2014-0057030 filed May 13, 2014, the entire contents of which is incorporated herein for all purposes by this reference.

BACKGROUND OF THE INVENTION

1. Field of the Invention

The present invention relates to an inside mirror assembly for a vehicle. More particularly, it relates to an inside mirror assembly for a vehicle, which is an inside mirror assembly without black bezel, so called frameless type and may implement reflective surfaces in day and night modes in accordance with light reflectivity.

2. Description of Related Art

In general, an inside mirror (also called a room mirror) for a vehicle serves to assure a visual field at a rear seat and a rear side visual field, and is mounted on a ceiling surface above a boundary portion between a driver seat and a front passenger seat so that an angle thereof may be adjusted.

Usually, an inside mirror assembly includes a housing which is assembled to the ceiling surface by a ball joint or the like, and a mirror glass which is mounted at a front side of the housing so as to reflect light.

Most of the mirror glasses have a structure having a flat reflective surface having a predetermined thickness, and as a result, there is a drawback in that light from a head lamp (particularly, a high beam) of a following vehicle is directly reflected which causes light blindness to a driver.

In the related art, a frameless inside mirror assembly, which may adjust light reflectivity in order to prevent light blindness to the driver, is published, and the published contents will be described below with reference to FIG. 1, FIG. 2A and FIG. 2B.

In FIG. 1, FIG. 2A and FIG. 2B, reference numeral 10 indicates a housing 10 of the inside mirror assembly, and reference numeral 20 indicates a prism glass.

The frameless type prism glass 20 is mounted and fixed to a front opening portion of the housing 10, and the prism glass 20 has a thickness that is gradually decreased from an upper side to a lower side.

In this case, the housing 10 is mounted by a ball joint unit 12 so that an angle thereof may be adjusted, and a lever 14, which is used to adjust the angle of the housing, is connected to the ball joint unit 12.

In particular, a front surface of the prism glass 20 is formed as a first reflective surface 21 which implements a night reflective mode, and a rear surface is formed as a second reflective surface 22 which is coated with a reflective material that implements a day reflective mode.

As illustrated in FIG. 2A and FIG. 2B, in the day reflective mode, a rear object and light are reflected by the second reflective surface 22 of the prism glass 20, such that the driver can see the rear object reflected by the second reflective surface 22, and at the same time, the light reflected by the second reflective surface 22 reflects into the eyes of the driver.

In contrast, in the night reflective mode, when the housing 10 is tilted upward (about 3.5°) by manipulating and moving the lever 14 downward on the basis of the ball joint 12 in order to reduce light reflectivity, the prism glass 20 is also tilted together with the housing 10 at the same angle, and as a result, the rear object and light are reflected by the first reflective surface 21 of the prism glass 20.

A reflection angle is adjusted by tilting the prism glass 20 in the night reflective mode as described above, such that light, which enters from the rear object (particularly, light from a head lamp of a following vehicle), is reflected by the first reflective surface 21 in a state in which reflectivity is reduced, thereby preventing light blindness to the driver.

However, the inside mirror assembly in the related art has the following problems.

Firstly, when the rear object is reflected by the first and second reflective surfaces of the prism glass in the day reflective mode and the night reflective mode, an image overlapping phenomenon in which a virtual image and a real image overlap each other occurs due to characteristics of the prism glass, and as a result, there is a problem in that the driver feels perplexed at the time of seeing the rear object with the eyes even though the driver may recognize the rear object.

Secondly, there is inconvenience in that when the driver drives the vehicle during the day time in the day reflective mode the next day after the driver drives the vehicle at night in the night reflective mode, the driver may not recognize the fact that the prism glass is tilted (because the housing is tilted, the driver may recognize that a position of the housing has been changed), such that the driver uses the prism glass by merely adjusting the housing, and does not recognize the changed position of the lever until the driver drives the vehicle at night, and then uses the prism glass by adjusting the housing again.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an inside mirror assembly for a vehicle, in which a fixed reflective plate which is fixed and mounted to a front opening portion of a housing, and a tilting reflective plate which is disposed to be parallel with a rear surface of the fixed reflective plate in a day reflective mode, and tilted in a night reflective mode are disposed in a forward and rearward direction, such that an image overlapping phenomenon in which a virtual image and a real image overlap each other in the day reflective mode may be reduced, a tilting trajectory of the tilting reflective plate for switching the day reflective mode and the night reflective mode may be always constant, and a state of the reflective mode may be intuitively recognized.

According to various aspects of the present invention, an inside mirror assembly for a vehicle may include a housing which has an opening portion formed at a front side thereof, a fixed reflective plate which is fixed and mounted to the opening portion of the housing, a tilting reflective plate which is tiltably mounted in the housing, and disposed parallel to a rear surface of the fixed reflective plate in a day reflective mode, or disposed so that an upper end portion of the tilting reflective plate is tiltable rearward at a predetermined angle on a basis of a lower end portion of the tilting reflective plate in order to reduce light reflectivity in a night reflective mode, and a tilting operation mechanism which is connected with the tilting reflective plate, mounted inside and outside of the housing, and adjusts an angle of the tilting reflective plate.

The fixed reflective plate may be manufactured using a transparent plastic material and may have a predetermined thickness.

Four edge portions of the fixed reflective plate may be bent rearward to have curved surfaces, and may be integrally joined to the opening portion of the housing while forming a frameless structure.

The tilting reflective plate may be manufactured using a plastic material, which has a front surface that is coated with a reflective material, and may have a predetermined thickness.

The tilting operation mechanism may include a tilting bracket which is integrally joined to a rear surface of the tilting reflective plate, a lever bracket which is attached to the tilting bracket, and hingedly fastened to an inner wall surface of the housing, and a tilting operation lever which is connected to a lower end portion of the lever bracket so as to tilt the lever bracket on a basis of a hingedly fastened point in order to tilt the tilting bracket and the tilting reflective plate at a predetermined angle.

The lever bracket may include a body portion which has first hinge pins that protrude at both sides of the body portion, and are hingedly fastened to first hinge ends formed on the inner wall surface of the housing, holding ends which are formed integrally with an upper end portion of the body portion so as to hold the tilting bracket, and a tilting operation end which is formed integrally with a lower end portion of the body portion.

Fixing pins may be integrally formed at both upper end portions of the tilting bracket, and fixing holes into which the fixing pins are press-fitted and fastened may be formed in the holding ends of the lever bracket.

The tilting operation lever may include a lever hinge end, which has second hinge pins that are formed at both sides of the lever hinge end, and are hingedly fastened to second hinge ends formed on the inner wall surface of the housing, and a lever handle end, which has a locking groove into which a tilting operation end is inserted, is formed integrally with the lever hinge end, and is extended outward from the housing.

Through the aforementioned technical solutions, the present invention provides the effects below.

Firstly, the tilting reflective plate is disposed to be parallel with the rear surface of the transparent fixed reflective plate fixed and mounted to the front opening portion of the housing in the day reflective mode, such that only the real image is reflected without a virtual image when a rear object is reflected by the tilting reflective plate, thereby providing a clear rear side visual field.

Secondly, in the night reflective mode, the tilting reflective plate is adjusted to be tilted rearward from the fixed reflective plate, such that reflectivity of light (for example, a head lamp of a following vehicle) entering the tilting reflective plate is reduced, thereby preventing light blindness to the driver.

Thirdly, unlike the related art in which the housing itself is tilted, a tilting angle of the tilting reflective plate may be adjusted using a lever, thereby preventing inconvenience when a user needs to intuitively recognize the current reflective mode by a position of the reflective plate and a position of the lever, and needs to adjust a position of the housing to an appropriate position.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An object of the present invention is that only a real image of a rear object may be clearly viewed without a virtual image displayed through an inside mirror when a driver drives a vehicle during the day time, and light blindness to the driver may be prevented by reducing reflectivity of light (for example, light from a head lamp of a following vehicle) entering from a rear side when the driver drives the vehicle during the night time.

To this end, an inside mirror assembly according to the present invention includes a transparent fixed reflective plate which is fixed and mounted to a front opening portion of a housing, and a tilting reflective plate which is disposed to be parallel with a rear surface of the fixed reflective plate in a day reflective mode, and disposed to be tilted at a predetermined angle from the rear surface of the fixed reflective plate in a night reflective mode.

Figure 1:
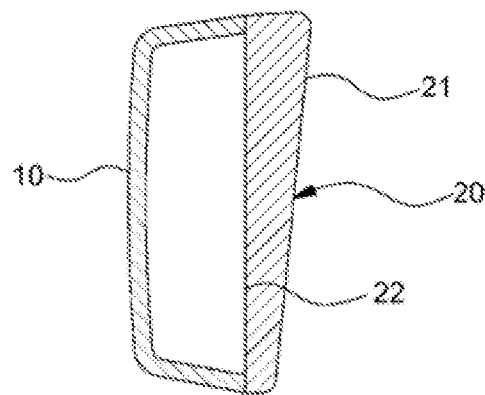
FIG. 1 is a schematic view illustrating a frameless inside mirror assembly in the related art.
Figure 2A:
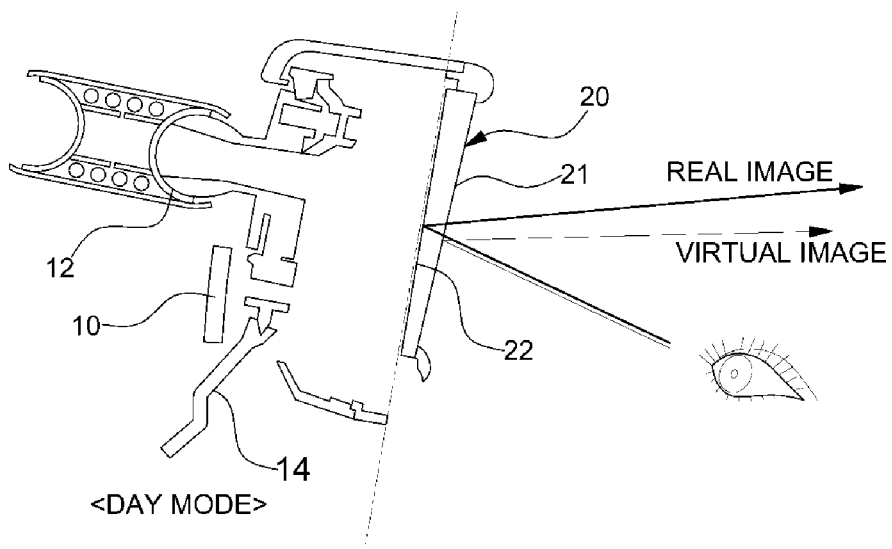
FIG. 2A and FIG. 2B are schematic views illustrating day and night reflective modes of a general inside mirror assembly for a vehicle.
Figure 2B:
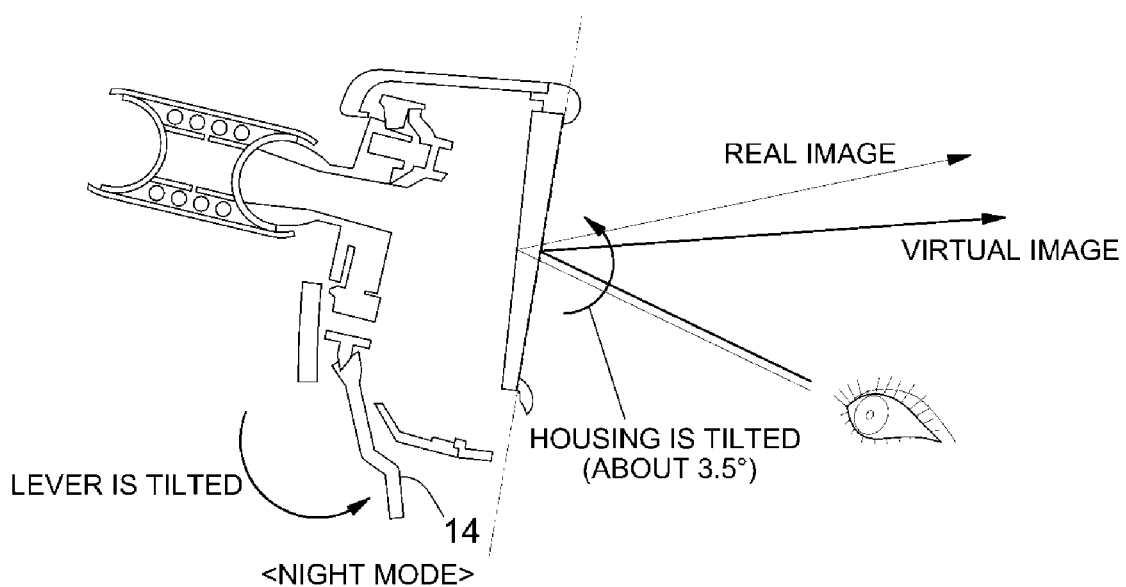
Figure 3:
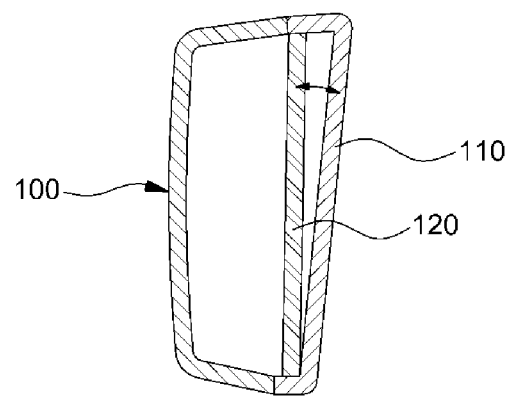
FIG. 3 is a schematic view illustrating an exemplary inside mirror assembly for a vehicle according to the present invention.
Figure 4A:
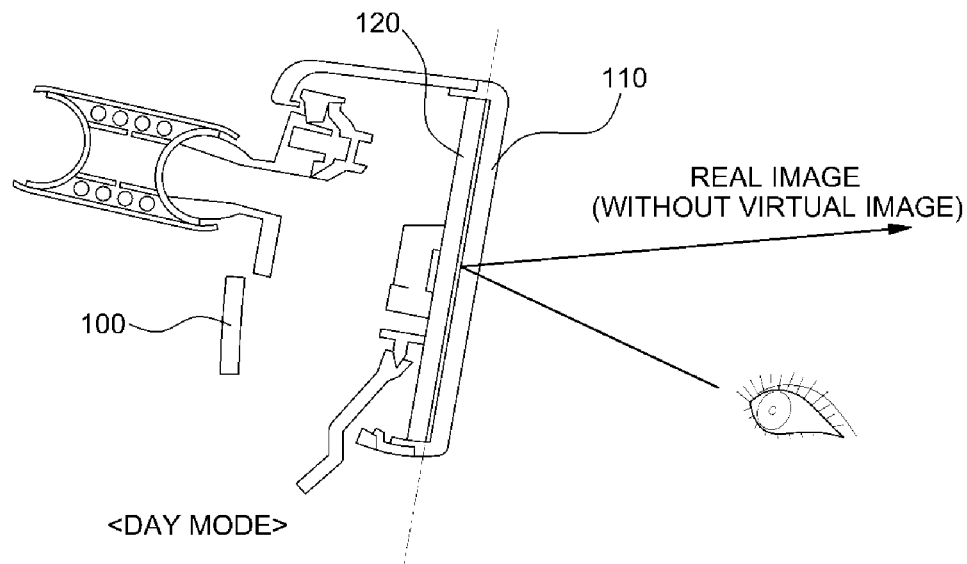
FIG. 4A and FIG. 4B are schematic views illustrating day and night reflective modes of the inside mirror assembly for the vehicle according to the present invention.
Figure 4B:
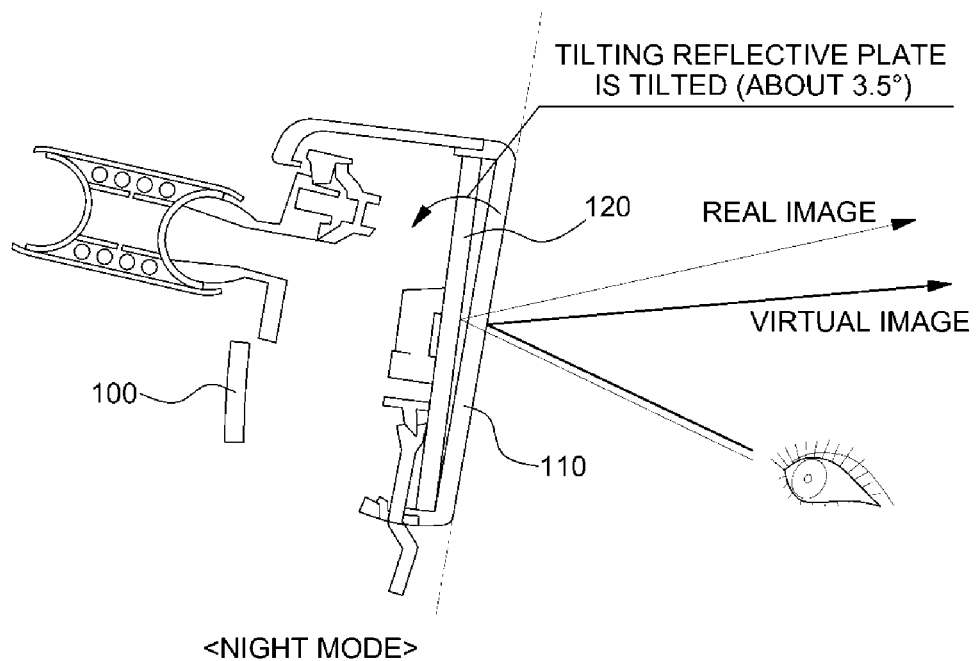
Figure 5:
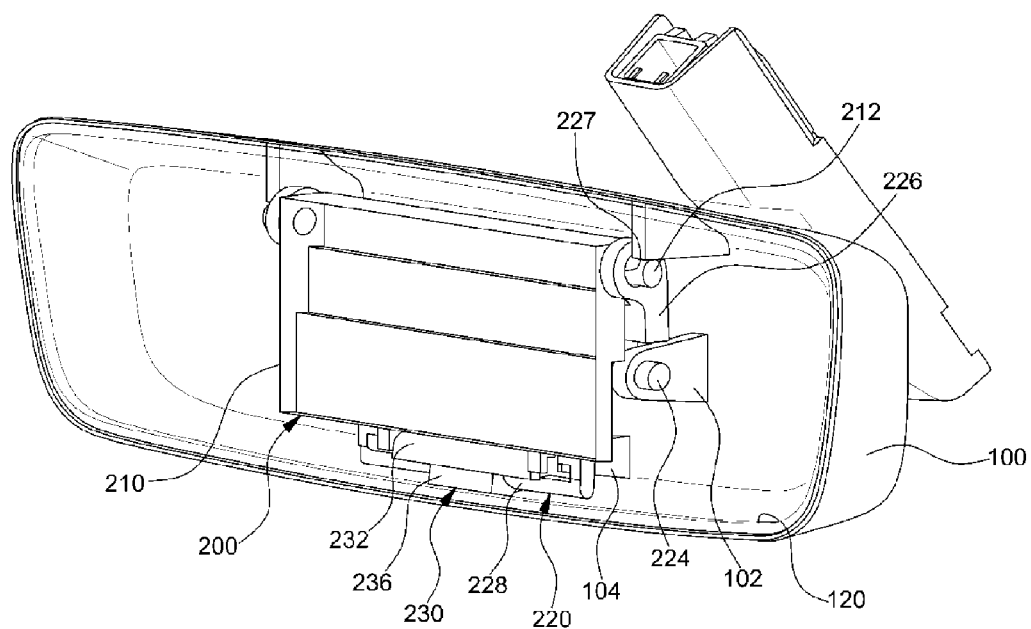
FIG. 5 and FIG. 6 are perspective views illustrating a tilting operation mechanism of the exemplary inside mirror assembly for the vehicle according to the present invention.
Figure 6:
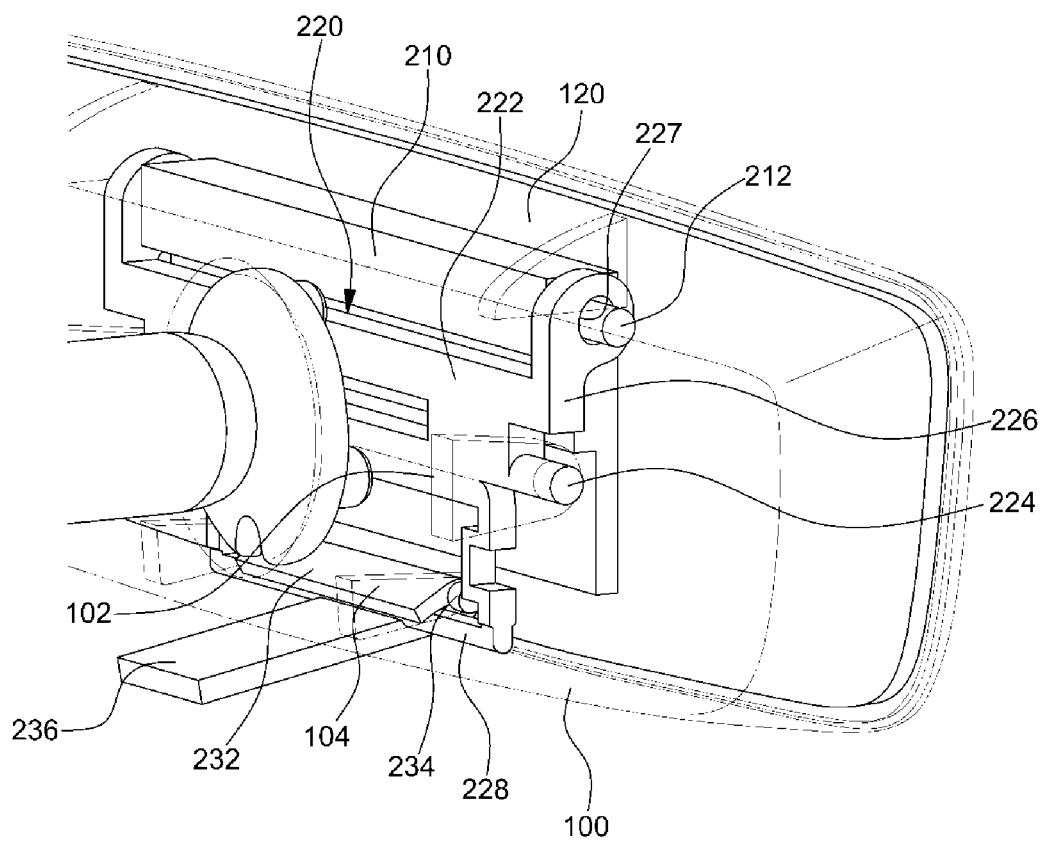
Figure 7A:
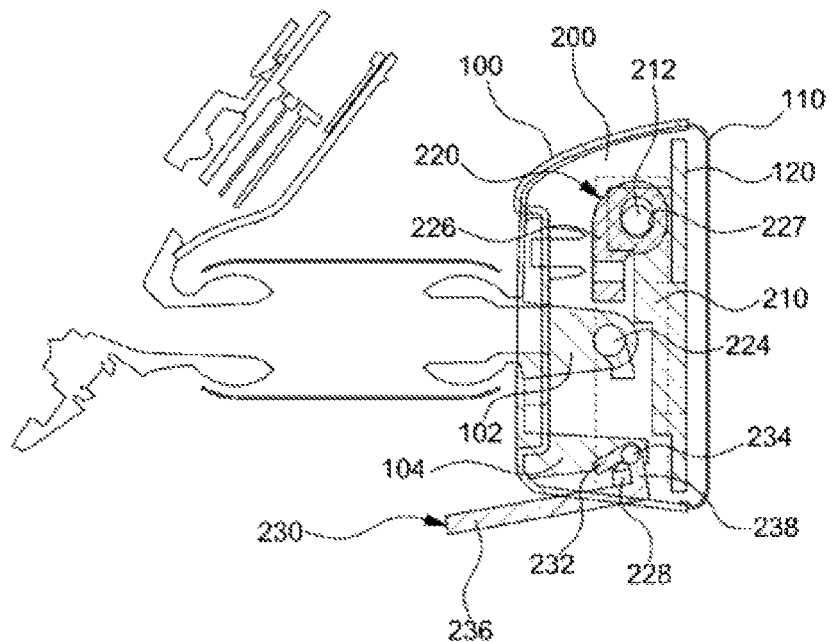
FIG. 7A and FIG. 7B are cross-sectional views illustrating a method of adjusting a tilting angle with respect to a tilting reflective plate of the exemplary inside mirror assembly for the vehicle according to the present invention.
Figure 7B:
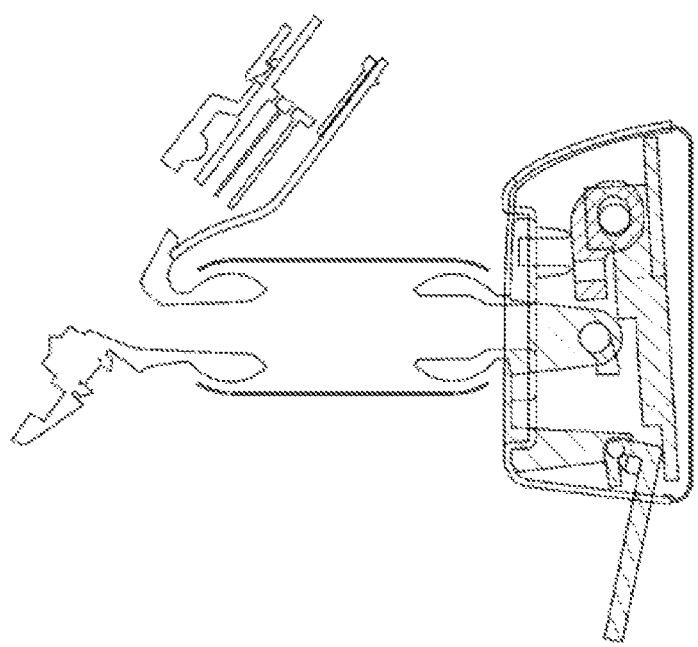

FIG. 3 is a schematic view illustrating the inside mirror assembly for a vehicle according to the present invention, and FIG. 4A and FIG. 4B are schematic views illustrating the day and night reflective modes of the inside mirror assembly for a vehicle according to the present invention.

In FIG. 3, FIG. 4A and FIG. 4B, reference numeral 100 indicates the housing of the inside mirror assembly.

The housing 100 is joined to a ceiling surface above a boundary portion between a driver seat and a front passenger seat in a ball joint manner, and has a structure having an opened front side.

The transparent fixed reflective plate 110 is fixed and mounted to the front opening portion of the housing 100.

In more detail, the fixed reflective plate 110 may be manufactured using a transparent plastic material so as to have a predetermined thickness, and has a structure having four edge portions that are bent rearward to have curved surfaces.

In this case, the four edge portions of the fixed reflective plate 110 are integrally joined to the front opening portion of the housing 100 while forming a frameless structure.

The tilting reflective plate 120 is mounted in the housing 100 so as to be tiltable by a tilting operation mechanism 200.

In particular, the tilting reflective plate 120 may be manufactured using a plastic material, which has a front surface that is coated with a reflective material, so as to have a predetermined thickness, and serves to illuminate the rear object so that the driver can substantially see the rear object.

Accordingly, by an operation of the tilting operation mechanism 200, the tilting reflective plate 120 is disposed to be parallel with the rear surface of the fixed reflective plate 110 in the day reflective mode, and the tilting reflective plate 120 is disposed so that an upper end portion of the tilting reflective plate 120 is tilted rearward at a predetermined angle on the basis of a lower end portion of the tilting reflective plate 120 in the night reflective mode in order to reduce light reflectivity.

Here, a configuration of the tilting operation mechanism will be described below with reference to FIG. 5, FIG. 6, FIG. 7A and FIG. 7B.

The tilting operation mechanism 200 is mounted inside and outside the housing 100 so as to serve to adjust a tilting angle of the tilting reflective plate 120, and includes a tilting bracket 210 which is integrally joined to a rear surface of the tilting reflective plate 120 so as to be tilted together with the tilting reflective plate 120 at the same angle, a lever bracket 220 which is attached to the tilting bracket 210, and hingedly fastened to an inner wall of the housing 100 so as to tilt the tilting bracket 210 at a predetermined angle, and a tilting operation lever 230 which is connected to a lower end portion of the lever bracket 220 so as to tilt the lever bracket 220 on the basis of a hingedly fastened point.

The tilting bracket 210 is provided in a flat plate shape that is integrally joined to the rear surface of the tilting reflective plate 120, and fixing pins 212 protrude integrally with both upper end portions of the tilting bracket 210 so that the tilting bracket 210 is connected with the lever bracket 220.

The lever bracket 220 includes a body portion 222 which has first hinge pins 224 that protrude at both sides of the body portion 222, and are hingedly fastened to first hinge ends 102 that protrude integrally with a rear wall surface in the housing 100; holding ends 226 which are vertically extended upward at both upper end positions of the body portion 222, and connected to the tilting bracket 210; and a tilting operation end 228 which is formed integrally with a lower end portion of the body portion 222, and connected with the tilting operation lever 230.

In this case, fixing holes 227 into which the fixing pins 212 of the tilting bracket 210 are inserted and fastened are formed in the holding ends 226 of the lever bracket 220.

The tilting operation lever 230 includes a lever hinge end 232 which has second hinge pins 234 that are formed at both sides of the lever hinge end 232 and hingedly fastened to second hinge ends 104 that integrally protrude at lower ends of the rear wall surface in the housing 100; and a lever handle end 236 which is formed integrally with the lever hinge end 232, and extended to be elongated outward from the housing 100 so that a user may manipulate the lever handle end 236.

In particular, a locking groove 238 into which the tilting operation end 228 of the lever bracket 220 is inserted and fixed is formed between the lever hinge end 232 and the lever handle end 236.

Here, a use state of the inside mirror assembly of the present invention having the aforementioned configuration will be described below.

Day Reflective Mode

In the day reflective mode, the tilting reflective plate 120 is disposed to be parallel with the rear surface of the transparent fixed reflective plate 110 fixed and mounted to the front opening portion of the housing 100, such that only the real image is viewed without a virtual image when the rear object is viewed on the tilting reflective plate 120, thereby providing a clear rear side visual field to the driver.

To this end, when the tilting operation lever 230 is first pushed toward a rear side of the housing 100 (in a direction toward a windshield glass), the tilting operation end 228 of the lever bracket 220, which is inserted into the locking groove 238 of the tilting operation lever 230, is angularly rotated rearward on the basis of hinged rotation points, that is, points where the first hinge pins 224 of the body portion 222 are hingedly fastened to the first hinge ends 102, and at the same time, the holding ends 226, which are formed integrally with an upper portion of the body portion 222, are angularly rotated forward (in a direction toward the interior of the vehicle).

At the same time, the tilting bracket 210, which is connected with the holding ends 226 of the lever bracket 220, is also angularly rotated forward at the same angle, and the tilting reflective plate 120, which is joined to the tilting bracket 210, is also angularly rotated at the same angle, such that the tilting reflective plate 120 is disposed to be parallel with the rear surface of the fixed reflective plate 110, as illustrated in FIG. 4A, FIG. 4B, FIG. 7A and FIG. 7B.

Therefore, the image of the rear object (for example, the following vehicle) and light entering from the rear side directly pass through the transparent fixed reflective plate 110, are formed on the tilting reflective plate 210 immediately after the transparent fixed reflective plate 110, and simultaneously reflected.

In this case, since the fixed reflective plate 110 and the tilting reflective plate 120 are disposed to be parallel with each other, only the real image of the rear object is reflected without a virtual image while being formed on the tilting reflective plate 120, and as a result, the driver can clearly see the rear object.

Night Reflective Mode

In the night reflective mode, the tilting reflective plate is adjusted to be tilted rearward from the fixed reflective plate at a predetermined angle, such that reflectivity of light (for example, a head lamp of a following vehicle) entering the tilting reflective plate is reduced, thereby preventing light blindness to the driver.

To this end, when the tilting operation lever 230 is pulled forward (in a direction toward the interior of the vehicle), the tilting operation end 228 of the lever bracket 220, which is inserted into the locking groove 238 of the tilting operation lever 230, is angularly rotated forward on the basis of hinged rotation points, that is, points where the first hinge pins 224 of the body portion 222 are hingedly fastened to the first hinge ends 102, and at the same time, the holding ends 226, which are formed integrally with an upper portion of the body portion 222, are angularly rotated rearward (in a direction toward the rear wall surface of the housing).

At the same time, the tilting bracket 210, which is connected to the holding ends 226 of the lever bracket 220, is also angularly rotated rearward at the same angle, and the tilting reflective plate 120, which is joined to the tilting bracket 210, is also angularly rotated rearward at the same angle.

That is, as illustrated in FIG. 4A, FIG. 4B, FIG. 7A and FIG. 7B, an upper end portion of the tilting bracket 210 is tilted rearward on the basis of a lower end portion, such that the tilting bracket 210 is tilted from the rear surface of the fixed reflective plate 110.

Therefore, the tilting bracket 210 is tilted rearward so as to serve to reduce reflectivity of light entering from the rear side.

Accordingly, the image of the rear object (for example, the following vehicle) entering from the rear side passes through the transparent fixed reflective plate 110, and is formed on the tilting reflective plate 210 that is tilted rearward, and simultaneously serves to reduce reflectivity of rear light (for example, light from the head lamp of the following vehicle), which enters the tilting reflective plate 210 from the rear side, thereby preventing light blindness when the driver drives the vehicle at night.

As described above, since the inside mirror includes the fixed reflective plate and the tilting reflective plate, the rear object may be clearly viewed in the day reflective mode, light blindness may be prevented by reducing light reflectivity in the night reflective mode, and a tilting trajectory (about 3.5°) of the tilting reflective plate for switching the day reflective mode and the night reflective mode may be allowed to be frequently adjusted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inside mirror assembly for a vehicle, comprising:
   a housing having an opening portion formed at a front side thereof;
   a fixed reflective plate fixed and mounted to the opening portion of the housing;
   a tilting reflective plate tiltably mounted in the housing, and disposed parallel to a rear surface of the fixed reflective plate in a day reflective mode, or disposed so that an upper end portion of the tilting reflective plate is tiltable rearward at a predetermined angle on a basis of a lower end portion of the tilting reflective plate in order to reduce light reflectivity in a night reflective mode; and
   a tilting operation mechanism connected with the tilting reflective plate, mounted inside and outside of the housing, adjusting a tilting angle of the tilting reflective plate,
   wherein the tilting operation mechanism includes a tilting bracket hingedly fastened to an inner wall surface of the housing; and
   wherein a lever bracket includes:
      a body portion having first hinge pins that protrude at both sides of the body portion, and are hingedly fastened to first hinge ends formed on the inner wall surface of the housing;
      holding ends formed integrally with an upper end portion of the body portion so as to hold the tilting bracket; and
      a tilting operation end formed integrally with a lower end portion of the body portion.

2. The inside mirror assembly of claim 1, wherein the fixed reflective plate is manufactured using a transparent plastic material and has a predetermined thickness.

3. The inside mirror assembly of claim 1, wherein four edge portions of the fixed reflective plate are bent rearward to have curved surfaces, and integrally joined to the opening portion of the housing while forming a frameless structure.

4. The inside mirror assembly of claim 1, wherein the tilting reflective plate is manufactured using a plastic material, which has a front surface that is coated with a reflective material, and has a predetermined thickness.

5. The inside mirror assembly of claim 1, wherein the tilting operation mechanism includes:
   the tilting bracket integrally joined to a rear surface of the tilting reflective plate;
   the lever bracket attached to the tilting bracket; and
   a tilting operation lever connected to the lower end portion of the lever bracket so as to tilt the lever bracket on a basis of a hingedly fastened point in order to tilt the tilting bracket and the tilting reflective plate at a predetermined angle.

6. The inside mirror assembly of claim 5, wherein the tilting operation lever includes:
   a lever hinge end which has second hinge pins that are formed at both sides of the lever hinge end, and are hingedly fastened to second hinge ends formed on the inner wall surface of the housing; and
   a lever handle end which has a locking groove into which a tilting operation end is inserted, is formed integrally with the lever hinge end, and is extended outward from the housing.

7. The inside mirror assembly of claim 1, wherein fixing pins are integrally formed at both upper end portions of the tilting bracket, and fixing holes into which the fixing pins are press-fitted and fastened are formed in the holding ends of the lever bracket.

* * * * *